Dec. 30, 1941.   J. LEDWINKA ET AL   2,268,291
VEHICLE CONSTRUCTION
Original Filed April 20, 1936   4 Sheets-Sheet 1
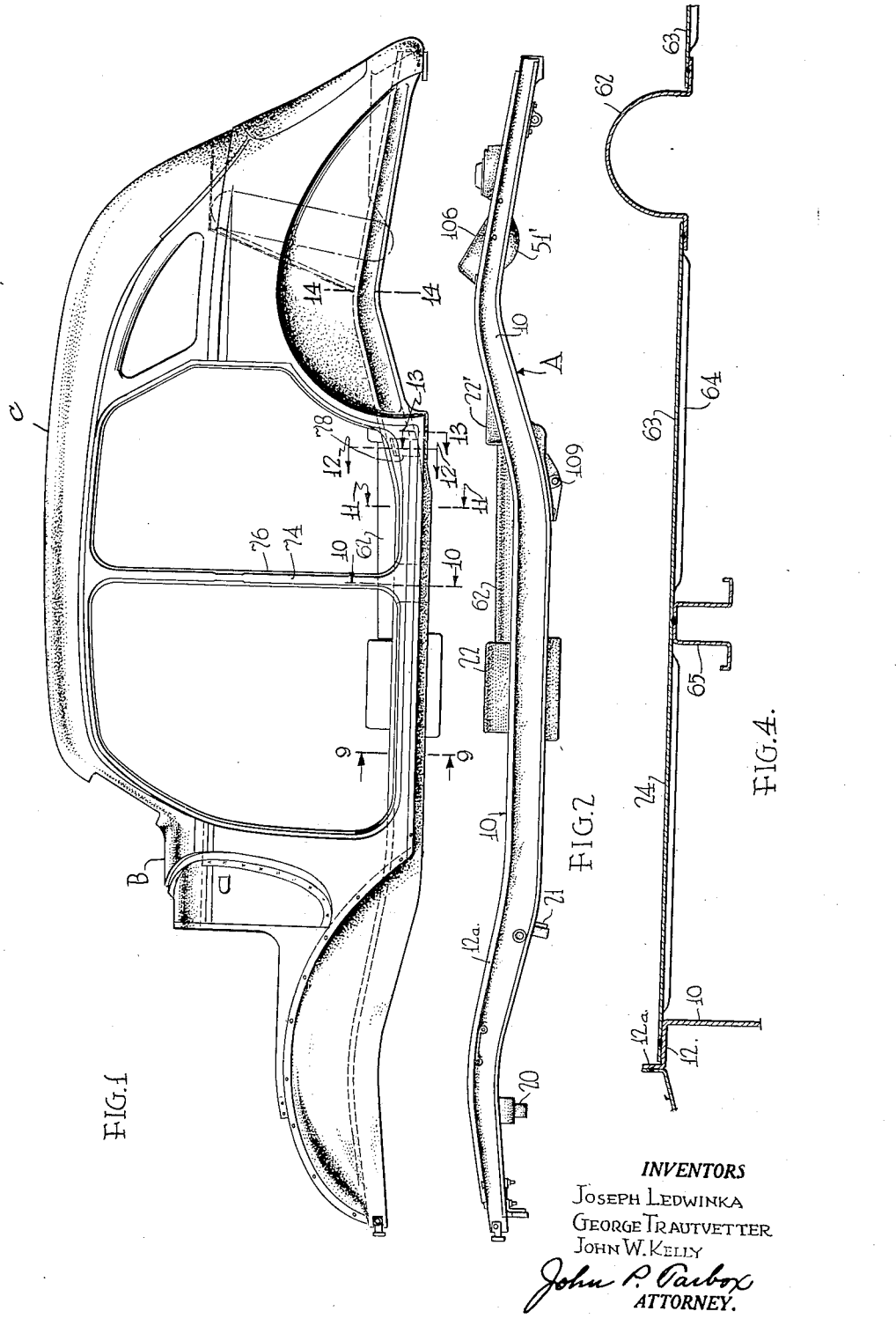
INVENTORS
JOSEPH LEDWINKA
GEORGE TRAUTVETTER
JOHN W. KELLY
John P. Fairbox
ATTORNEY.

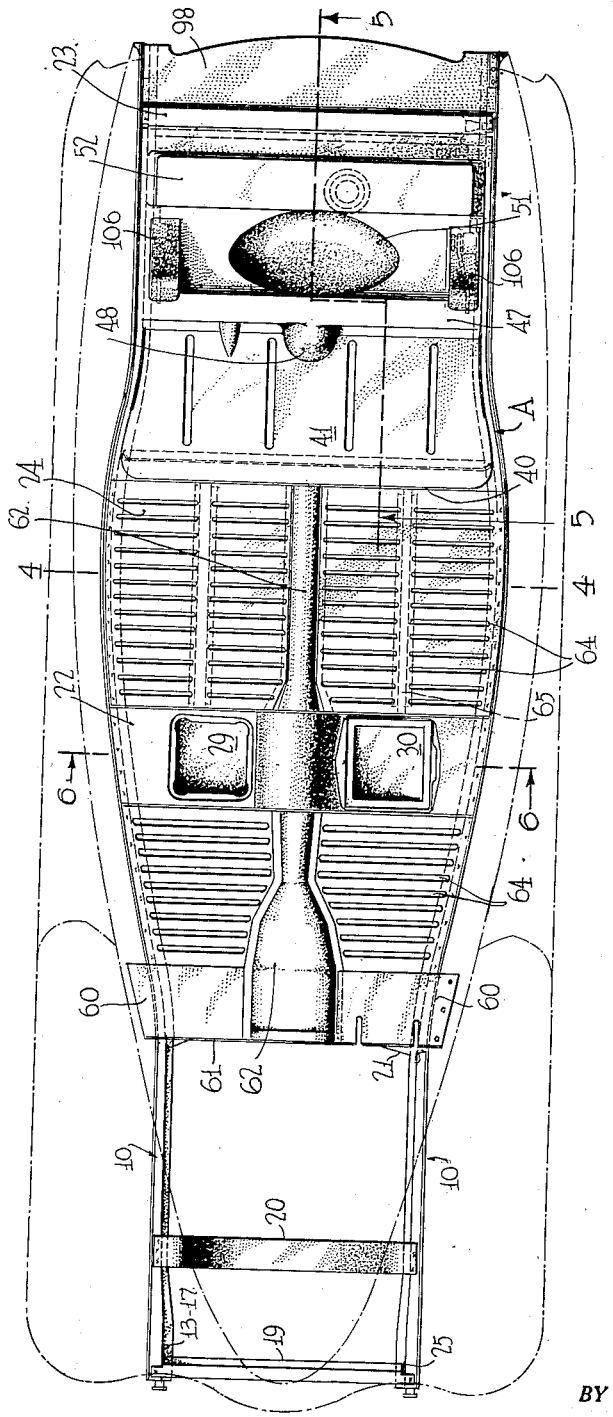

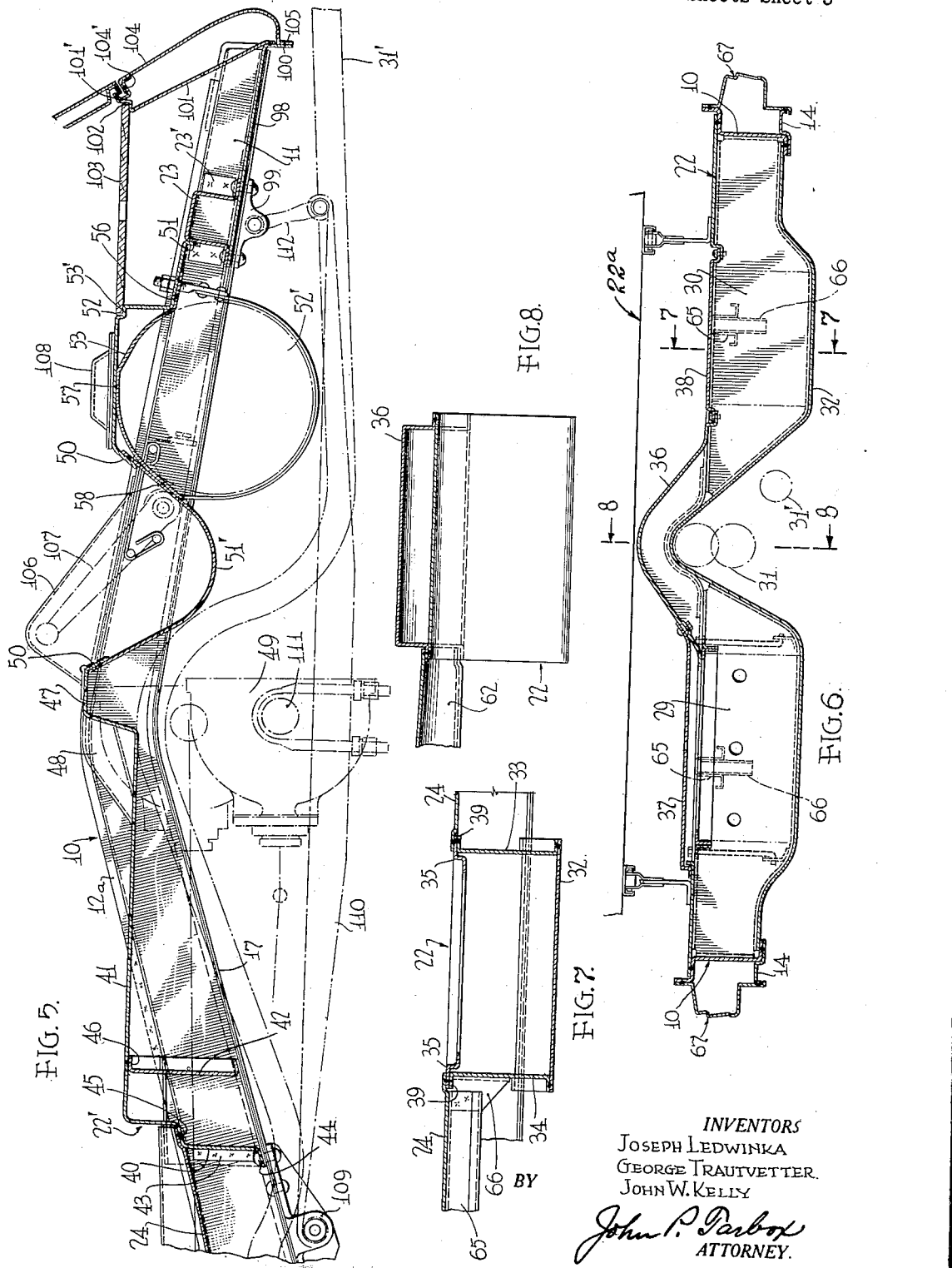

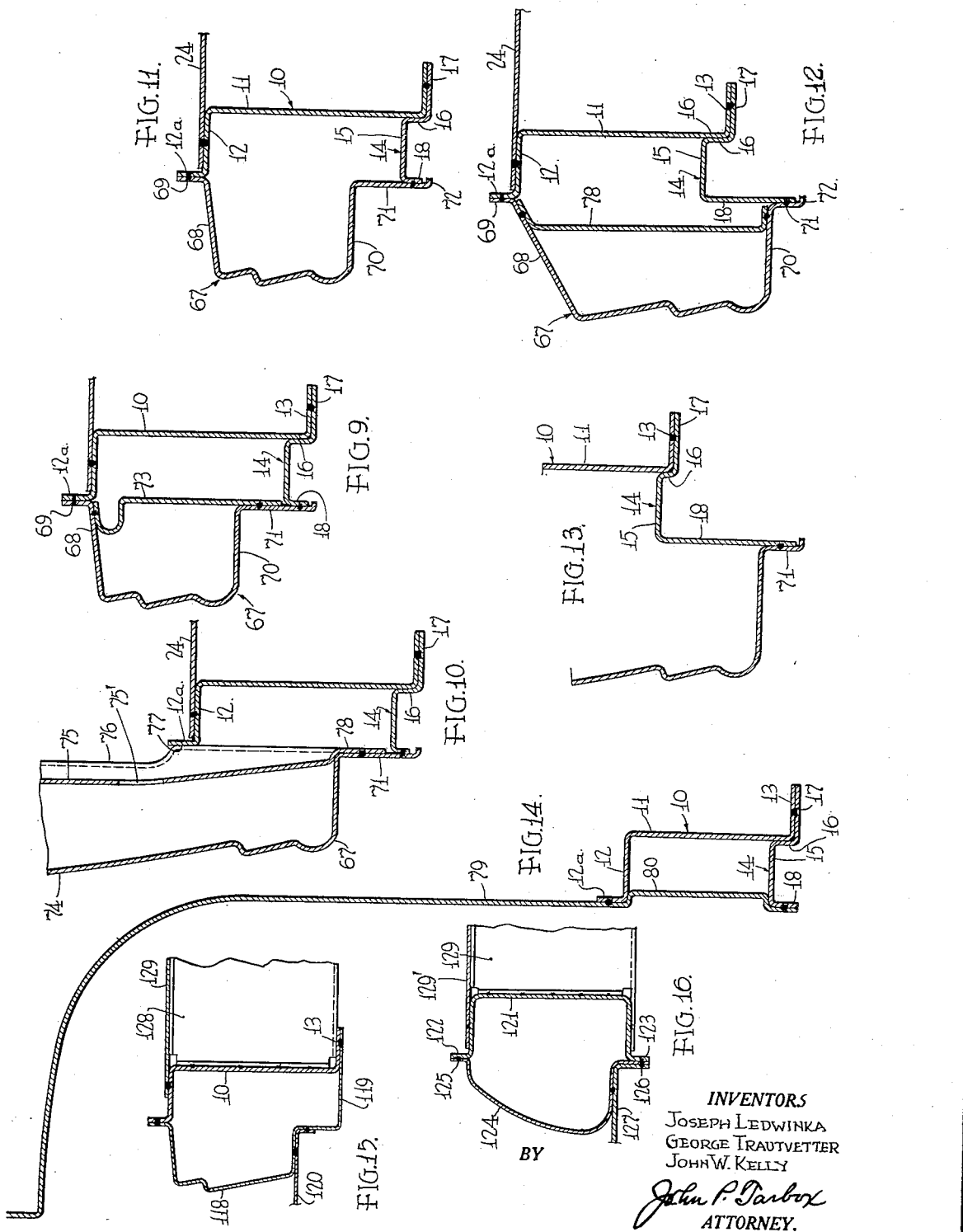

Patented Dec. 30, 1941

2,268,291

UNITED STATES PATENT OFFICE 2,268,291

VEHICLE CONSTRUCTION

Joseph Ledwinka, George Trautvetter, and John W. Kelly, Philadelphia, Pa., assignors to Edward G. Budd Manufacturing Co., Philadelphia, Pa., a corporation of Pennsylvania Application April 20, 1936, Serial No. 75,374
Renewed July 4, 1939

10 Claims. (Cl. 280—106)

The invention relates to pressed metal passenger car vehicle and particularly to the floor plating of a combined body and chassis construction of such vehicles.

The objects of the invention as well as the particular manner in which they are attained will become more apparent from the following detailed description when read in connection with the accompanying drawings forming a part of this specification:

In the drawings,

Fig. 1 shows in side elevation a combined body and chassis construction according to the invention.

Fig. 2 shows in side elevation an underframe sub-assembly according to the invention.

Fig. 3 shows in a plan view the underframe sub-assembly and, in dot and dash lines the outline of the body superstructure in association therewith.

Fig. 4 is a fragmentary detail sectional view of the underframe on an enlarged scale taken along the line 4—4 of Fig. 3.

Fig. 5 is an enlarged longitudinal sectional view along the line 5—5 of Fig. 3 showing the rear portion of the combined body and chassis underframe construction.

Fig. 6 is a transverse vertical sectional view along the line 6—6 of Fig. 3, these sections being sections of the finally assembled combined body and chassis structure.

Figs. 7 and 8 are detail sectional views along the lines 7—7 and 8—8 of Fig. 6.

Figs. 9, 10, 11, 12, 13 and 14 are enlarged detail sectional views taken along the lines indicated by corresponding numerals in Fig. 1.

Fig. 15 is a sectional view similar to Fig. 11 showing a slightly modified construction, and Fig. 16 is a similar view of a still further modification.

In the drawings there is shown a preferred form of the invention as applied to a sedan type of body. The combined body and chassis underframe sub-assembly is designated generally by the letter A and the body superstructure includes the side wall subassemblies designated generally by the letter B and the roof sub-assembly by C. All of these sub-assembly structures are preferably fabricated out of light gauge metal, although the main longitudinal side members of the underframe may, if desired, be of slightly heavier gauge than the body superstructure paneling and the underframe flooring.

According to the form of the invention disclosed in Figs. 1 to 14, inclusive, the main longitudinal side members of the underframe comprise longitudinal side sills 10 extending from end to end of the structure and conforming in plan generally to the outer contour of the lower side portions of the body superstructure and formed at front and rear with the usual kick-up portions to afford room for the vertical displacement of the axles relative thereto.

As shown most clearly in Figs. 9 to 14, inclusive, these sill members 10 are of generally outwardly presenting hollow section. In this form of the invention they are of substantially Z-cross section comprising a deep vertical web 11, an upper outwardly extending arm 12 and a lower inwardly extending arm 13. To provide a convenient final assembly joint and to further stiffen the structure the upper outwardly extending arm 12 is formed with an upwardly extending marginal flange 12a. For convenience in the final assembly and to afford additional stiffness and strength to the side sill members 10 they are reinforced in their lower portions by a generally downwardly presenting channel member 14 extending substantially throughout the length of the sills. The bottom wall 15 of channel member 14 is of a width corresponding to the width of the upper arm 12 of the sill member 10, and the inner side wall 16 of the channel 14 is formed with an inwardly extending flange 17 of substantially the width of the lower arm 13 of the still member 10, the angle formed by the side wall 16 and the flange 17 being adapted to nest with the angle formed by the web 11 and flange 13 and to be secured to the member 10 by a line of spot welds joining the flanges 13 and 17 as indicated in the drawings. Thus a double thickness construction is provided along the lower margin of the web 11 which adds materially to the strength of the structure and forms a strong ledge for supporting and securing the cross members of the underframe. The outer side wall 18 of the channel 14 forms a downwardly extending flange similar to the upwardly extending flange 12a on the sill member 10. In the region just forward of the rear wheel housing as shown in Figs. 12 and 13, this outer wall 18 is vertically deepened to conform with the lower edge of the body superstructure which is carried rearwardly in this region at a somewhat lower level than the bottom flange 13 of the sill member 10.

The underframe A is transversely stiffened against torsional and other stresses by a number of transverse cross members designated (see Figs. 3 and 5) by numerals 19, 20, 21, 22 and 23 and the body floor paneling designated generally by the reference numeral 24 interconnecting these cross members and the side sills and extending from the region of the cowl to the region of the rear end of the frame. The principal cross members 20, 21, 22 and 23 are preferably of box or deep channel form and strongly secured to the side sills to resist torsional and other stresses.

The cross member 22, as shown in Fig. 3 and in greater detail in Figs. 6, 7 and 8 is a deep and wide box section structure arranged below the driver's seat 22a which is diagrammatically indicated in Fig. 6. The lateral portions of cross member 22, where joined to the sills being substantially of a depth corresponding to the depth of the side sills 10 and inwardly thereof the bottom is extended downwardly to form on opposite sides of the center line deep box section compartments 29 and 30 adapted to serve as battery box and radio receptacle, respectively. Between these receptacles the cross member is bowed upwardly and of shallower depth to make room for the transmission shaft indicated at 31 and the exhaust pipe indicated at 31'.

Because of its irregular transverse cross section, see Fig. 6, this member is preferably built up of a continuous bottom plate 32, side walls comprising outwardly facing channels 33, 34 secured through their lower side walls to the bottom plate by spot welding and secured through their top walls to the body floor paneling extending forwardly and rearwardly from the cross member 22 and to a top plate 35 (see Fig. 7). In the central upwardly bowed portion the top and sides of the box section are formed by a downwardly facing outwardly flanged channel 36 as shown in Fig. 8.

The top plate 35, 36 is formed with openings over the compartments 29 and 30, which openings are ordinarily closed by suitable cover plates 37 and 38. The laterally extending double thickness flanges 39 formed by the joinder of the top plate and the side walls 33 and 34 conveniently serve as seats to receive the adjacent edges of the floor plates forming parts of the body flooring forwardly and rearwardly of the cross member 22 and affording additional stiffness by reason of their securement thereto by spot welding as shown in Fig. 7.

It is understood, however, that this cross member may in some cases be simply a channel facing upwardly and having flanged side walls which are secured to the body flooring panel as will later be described in connection with Figs. 15 and 16. In fact, in the form shown, the top plate 35 may be considered a part of the body flooring panel in continuation of the adjacent floor panels extending forwardly and rearwardly thereof, and come under the general designation of floor paneling indicated generally by numeral 24. Also, while this plating is shown and described as consisting of a number of separate stampings spot welded or otherwise secured together in their margins to form a continuous flooring from side to side and end to end of the body, it is obvious that, where desired, the entire flooring panel may be made as a unitary stamping or, at least, a less number of such stampings than herein shown and described.

As clearly shown in Fig. 5, a substantially channel section cross member 22' is provided at the region of the rear seat riser, this cross member in fact forming the rear seat riser through its front wall 40 which is a vertical continuation of the horizontally extending seat pan or flooring panel 41, the seat pan 41 forming the top of the channel of the cross member, while a separate member 42 forms the rear wall of the channel. The front wall of this channel cross member is secured to the side sills, to the vertical web thereof through a lateral flange 43 and to the bottom inwardly extending flange 13, 17 through an edge flange 44, and to the top flange 12 by a lateral extension of the offset portion 45, the rear wall 42 being similarly secured to the three faces of the Z-section of the side sills. This rear wall 42 is also flanged at the top at 46 for securement to the seat pan 41. The seat pan 41 may form the flooring panel all the way from the seat riser to the rear cross member 23. At the sides it overlaps the top flange 12 of the side sill and is secured thereto by spot welding. At the rear of the seat location the seat pan is stiffened by being formed to provide a downwardly presenting channel section portion 47 (see Fig. 5) and has its central portion formed with an upwardly projecting bulge 48 forwardly of said channel section portion, the channel and bulge providing room for the vertical movement of the differential housing indicated at 49. Rearwardly from the channel section portion 47 to the rear cross member 23 the seat pan is of irregular shape but extending from side sill to side sill and secured as in its forward portion to the top walls of the side sills. In its rear edge it is flanged at 51 for securement to the cross member 23. To provide a well for receiving the tire the seat pan stamping 41 is formed with an opening having depressed flanges 50 to which the tire well stamping 51' is spot welded. Directly in rear of this tire well the stamping 41 is upwardly bulged at 52 forming a transversely extending downwardly facing channel section portion affording additional stiffness and providing a space therebelow to receive a transversely extending gas tank indicated at 52'. A reinforcing stamping 53 conforming to the general contour of the gas tank is spot welded to the stamping 41 at 56 and 57 and to the tire well stamping 51 at 58, and forms therewith transverse box section structures.

As clearly appears in Figs. 3, 5, 7 and 9 to 12 the floor plating 24 forwardly, just as rearwardly, of the rear seat overlaps in its lateral margins the outwardly extending flange 12 of the side sills and is secured thereto by spot welding and at its rear margin it overlaps the offset seat 45 of the vertically extending heel board portion of the seat pan 41 and is secured thereto by spot welding, and in the region of the cross member 22 it overlaps the forwardly and rearwardly extending flanges 39 of the cross member and is spot welded thereto while at the front end it terminates at an upwardly extending toe board 60 which is formed at its front end with the flange 61 secured, in final assembly, to the dash structure in a manner to be described later.

As shown in this embodiment of the invention the floor plating or paneling 24 is formed in its central portion with a longitudinally extending generally semi-circular tunnel 62 projecting upwardly above the floor plating. This tunnel 62 may be and is preferably made as a separate stamping from the floor plating sections on the opposite sides thereof and is secured to the lateral extending sections of the floor plating designated by the numeral 63 (see Fig. 4) by spot welding the marginal flanges of the tunnel stamping to the floor plating sections 63. The floor plating laterally of the tunnel is stiffened by transverse ribbing 64 and between the cross member 22 and the rear seat riser 40 forming part of the channel section cross member 22' it is additionally stiffened by downwardly facing longitudinally extending flanged channel members 65 arranged between the tunnel and the side sills and secured through their bottom walls by spot welding to the floor plating and at their ends secured respectively to the cross member 22 and the seat riser 40. The latter securement may be by channel brackets 66 indicated in full lines, Fig. 7, and in dotted lines, Fig. 6, which are spot welded to the vertically extending walls of the cross member 22, the side walls being telescoped within the side walls of the channels 65 and secured thereto by spot welding.

As shown in Fig. 5, the rear cross brace 23 is a box cross section formed by a downwardly presenting flanged channel secured through lateral flanges 23' on its side walls to the vertical web 11 of the side sill members 10, through its laterally extended top wall to the top arms 12 and through the lateral edge flanges from its side walls and through the bottom closing plate 98 secured to said edge flanges to the double inwardly extending flanges 13, 17, as hereinafter more fully described.

By the construction described a very light combined body and chassis underframe is attained without sacrifice of necessary strength. This underframe is sufficiently rigid, without the addition of the superstructure, to be handled and shipped as a unit and to have all the chassis accessories including the running gear, the spring suspension and the transmission and other parts usually associated with the chassis assembled therewith prior to its final assembly with the body superstructure which gives to the underframe the additional strength required to serve as the combined body and chassis structure.

By referring to Figs. 9 to 14, it will be readily apparent how the body side paneling is formed in its lower margin to fit against and close the box section of the side sills extending from end to end of the combined structure of these sections taken along the corresponding section lines of Fig. 1, Figs. 9 and 11 indicating the construction at the front and rear door thresholds. In these regions it will be seen that the outer body contouring paneling designated generally by the numeral 67 is generally in the form of an inwardly presenting channel having its upper side wall 68 inwardly extending to form the thresholds of the doors and provided in its inner margin with an upwardly extending flange 69 adapted in final assembly to overlap the upwardly extending flange 12a of the side sill member 10 and secured thereto readily in final assembly by a line of spot welds. At the bottom the paneling is extended inwardly at 70 and formed at its inner margin with a downwardly extending flange 71 which overlaps the outer side wall flange 18 of the channel member 14 and is secured thereto by another line of spot welds. The extreme lower margin of the side panels 67 is slightly turned inwardly at 72 to stiffen the margin and to avoid a raw edge.

With the parts so joined together it will be seen that a deep and wide substantial box section structure is provided through the threshold portions strongly reinforcing the underframe in this region, even though the sheet metal parts entering into the box section are of relatively light gauge.

If desired, and as shown in Fig. 9, the threshold portion of the front door opening may in sub- assembly be further strengthened by welding a reinforcing strip 73 at its top to the threshold portion 68 of the outer paneling and in its bottom to the downwardly extending flange 71 as indicated in Fig. 9. In most cases, however, it is not necessary to use this reinforcement except at localized points of greatest stress.

In the region of the B—C post the construction may be that shown in Fig. 10 in which the outer paneling as 67 is extended upwardly to form the B—C post as at 74. This post is also formed as box section structure by the use of an inner channel 75 telescoped within the outer channel forming the main body of the post and welded in its margins by laterally extending flanges to correspondingly laterally extended flanges on the main body of the post, these flanges appearing most clearly in Figs. 1 and 10 where they are designated by the reference numeral 76. At the bottom this inner paneling is offset at 77, Fig. 10, and welded to the upwardly extending flange 12a of the underframe sill while its lower margin at 78 overlaps the downwardly extending flange 71 of the outer paneling and is secured thereto by spot welding. Thus even in the post region the box section of the combined body and chassis sill is preserved and additionally strengthened by the inner paneling 75. Access to the interior of the post for welding at 77, 12a is had through an opening provided in the inner panel 75 indicated at 75'.

In the region adjacent the wheel housing in the threshold of the rear door, as shown in Fig. 12, the outer paneling 67 has a more inclined threshold portion 68 and its outer portion is deeper in vertical direction. To additionally reinforce this deepened threshold portion of the outer paneling in this region a short inner reinforce 78 is spot welded through edge flanges to the threshold portion 68 and the inwardly extending portion 70 near the lower edge of the paneling. In the rear wheel housing region, as shown in Fig. 14, the wheel housing paneling as 79 overlaps the top and bottom flanges 12a and 18 of the side sill and is secured thereto by spot welding. To stiffen the box structure at this point the wheel housing paneling 79 is formed with a slight inward offset 80 between the arms 12 and 14 of the side sill 10, this offset portion rigidly spacing the arms 12 and 18 and thus reinforcing the box section structure in this region.

At the extreme rear the underframe sub-assembly is further reinforced transversely by a plate 98 overlapping the bottom inwardly extending double flanges 13, 17 of the side sill structures and secured thereto, this plate extending forwardly to overlap the lateral extending flanges of the cross member 23, all these parts being additionally secured together by the rivets extending therethrough and securing in place the bracket 99 for supporting the rear spring. At the rear end the plate 98 is formed with a downwardly extending flange 100 and to the upper portion of this flange 100 is secured the lower edge of a transversely extending inner panel 101 which extends up to the bottom of the baggage compartment opening and is flanged outwardly at 101' in the margin of said opening. This inner panel 101 is also formed with a transverse shoulder 102 just below the baggage compartment opening, upon which and the corresponding shoulder 53' provided in the upwardly offset portion 52 of the flooring in this region is arranged to rest a floor board 103 forming the flooring of the rear portion of the baggage compartment. In the final assembly the outer paneling 104 of the rear portion of the body superstructure forms with the inner paneling 101, a transverse box section structure being provided in the lower margin of the baggage compartment opening with an outwardly facing channel 104' spot welded to the outwardly extending flange 101' of the inner panel at the deck opening and turned in at its lower margin and formed with a downwardly extending flange 105 spot welded to the downwardly extending flange 100 as clearly appears from the showing in Fig. 5.

As clearly appears in Figs. 2, 3 and 5 on opposite sides of the tire well 51' and adjacent the side sills the flooring is formed with triangularly shaped upward bulges 106 which are provided to house the arms of the shock absorbers indicated at 107. In the floor of the baggage compartment above the gas tank is provided a cap 108 closing the filling opening of the gas tank.

In Fig. 5 is also shown a bracket 109 for supporting the front end of the spring 110 suspending the combined body and chassis structure from the axle indicated at 111, the rear end of the spring being supported from the bracket 99 through a suspension link 112.

The particular form of the side sill constructions may vary considerably and in Figs. 15 and 16 there are shown two sectional views through the threshold corresponding to the views shown in Figs. 9 and 11 in which the side sills of the preassembled underframe and the lower sides of the body joining thereto are varied somewhat from the construction shown in the preferred form. In Fig. 15 the form of the inner side sill member remains substantially the same as in preferred form but the outer paneling of the body side wall designated generally by the reference character 118 is in its lower portion extended inwardly at 119 to overlap the inwardly extending arm 13 of the inner sill member 10 and secured thereto by spot welding, thus eliminating the longitudinally extending member 14 shown in Figs. 9 and 10. In Fig. 15 there is also shown a running board 120 secured to its angular inner margin in nested relation with an angular portion of the outer panel stamping. Such a construction could obviously also be used with the modifications shown in Figs. 9 and 11, if desired.

According to the third modification shown in Fig. 16 the sills of the underframe are formed by unitary outwardly facing channels 121 flanged upwardly and downwardly in their top and bottom walls at 122 and 123. To these upwardly and downwardly extending flanges the body side walls as 124 are secured at top and bottom respectively by upwardly and downwardly extending flanges 125 and 126. A running board 127 is also shown in this construction joined in the angle between the downwardly extending flange and the body of the outer panel.

In the form shown in Fig. 15 the box section cross member as 128, of which the flooring plate 129 forms a structural part, the other component part being an upwardly presenting channel having edge flanges secured to the flooring plate 129. may be secured to the side sills in substantially identically the same manner as the box section cross members 20 and 22 are secured to the side sills of the preferred form and as shown in Fig. 6. In the form shown in Fig. 16, however, no inwardly extending flange is provided on the side sills and in this case the box section cross members, as 129, 129' while they may be secured to the top and vertical arms of the side sills in identically the manner shown in the construction of Fig. 15 and the preferred construction, are required to be extended at the bottom to overlap the outwardly extending bottom side wall of the sill 121 and secured to it through this extension as appears in Fig. 16. In this modification of Fig. 16, however, the body superstructure may be assembled just as in the preferred form as a complete superstructure subassembly unit including the sides and roof of the body. In some conditions of manufacture, the modification shown in Figs. 15 and 16 might be considered preferable to those shown in the preferred form.

It will be seen from the foregoing that while there have been described herein several specific modifications of the invention, other modifications are possible and without departing from the spirit of the invention as expressed in the claims appended hereto and such modifications are intended to be included within their scope. While the claims of the instant case relate to the floor structure, features of the body superstructure and of the combined body and chassis construction as disclosed in the foregoing specification and the attached drawings, form the subject matter of application Serial No. 379,762, filed February 20, 1941, for "Vehicle construction and method of assembling same," which is a division of the present application.

What we claim is:

1. In a combined vehicle body and chassis underframe, side sills and a floor plating extending between the side sills and formed in rearward direction successively with a seat riser, an upward offset to afford clearance for the rear axle and the differential, a downward offset to receive a spare tire and an upward offset to receive a gas tank, said seat riser forming the forward wall of a transverse sill and said upward offset extending the full width between the side sills, thereby presenting an additional strong transverse member.

2. In a combined vehicle body and chassis underframe, side sills, floor plating extending between the tops of said sills, a central upwardly bulged tunnel in the floor plating to receive the propeller shaft, and a box section transverse reinforce forming a continuation in its upper portion of said floor plating and tunnel and secured to the side sills through each of the side walls of its box section.

3. In a chassis or body underframe structure for automobiles, longitudinal side sills, a box sectional transverse sill arranged underneath a seat such as the driver's seat; said transverse sill comprising a bottom wall, substantially vertical side walls, and a top wall; said bottom wall comprising substantially horizontal lateral portions. whereas it is upwardly bent in and immediately adjacent the region of the longitudinal vertical middle plane of said structure as to provide a tunnel for a longitudinal driving shaft, the width and height of said transverse sill being so great as to offer ample storage space at both sides of such tunnel for comparatively large articles such as an electric battery; the side walls of such tunnel converging toward each other so as to assist in the transmission of stresses; said longitudinal side sills being connected to the ends of said transverse sill.

4. In a chassis or body underframe structure for automobiles, a pair of longitudinal side sill structures and a box sectional transverse sill arranged underneath a seat such as the driver's seat; said sill comprising a bottom wall, substantially vertically side walls and a top wall; the width of said transverse sill in the longitudinal direction of the automobile being considerably greater than its vertical depth so as to afford storage space in the interior of the transverse sill; said bottom wall being upwardly bent in and closely adjacent the region of the longitudinal middle plane of said structure, as to provide a tunnel for a longitudinal driving shaft; said top wall being likewise upwardly bent in substantially the same region as the bottom wall so as to extend the box sectional transverse sill uninterruptedly from one of said longitudinal side sill structures on the one side to the other longitudinal side sill structure on the opposite side of the underframe structure.

5. In a chassis or body underframe structure for automobiles, a floor panel, a box-sectional transverse sill; said transverse sill comprising a bottom wall, substantially vertical side walls and a top wall; said bottom wall comprising substantially horizontal lateral portions arranged below the level of said floor panel whereas said bottom wall is upwardly bent in and immediately adjacent the region of the longitudinal vertical middle plane of said structure as to provide a tunnel for a longitudinal driving shaft; said tunnel provided by said bottom wall extending to a level above the level of said floor panel and its upper portion forming substantially a continuation of a tunnel for the driving shaft which is provided in said floor panel in a region longitudinally adjacent said transverse sill.

6. In a chassis or body underframe for automobiles, longitudinal side sill structures and a box sectional transverse sill arranged underneath a seat such as the driver's seat; the ends of said transverse sill being rigidly connected to said side sill structures; said sill comprising a bottom wall, substantially vertical side walls, and a top wall; said bottom wall being upwardly bent in and closely adjacent the region of the longitudinal middle plane of said structure to a point near to or above the level of the main portion of said top wall so as to provide a tunnel for a longitudinal driving shaft; said top wall being likewise upwardly bent in substantially the same region as the bottom wall yet to a substantially lesser degree than the latter; said top wall and said bottom wall being spaced from each other throughout the length of said transverse sill so as to make said sill box sectional without interruption, thereby imparting great rigidity and torsional strength to said underframe structure as a whole.

7. In a combined body and chassis underframe structure for automobiles comprising longitudinal side sill structures and a floor panel interconnecting said side sill structures; a box sectional transverse sill arranged underneath a seat such as the driver's seat and extending downwardly beneath the level of said floor panel; said transverse sill interconnecting likewise said side sill structures; said transverse sill comprising a bottom wall, substantially vertical side walls, and a top wall; said top wall forming the body flooring in the region of said transverse sill; said bottom wall being downwardly spaced from said floor panel but having its central portion upwardly bent in and closely adjacent the region of the longitudinal vertical middle plane of said underframe structure as to provide a tunnel for a longitudinal driving shaft; said top wall and said bottom wall being spaced from each other throughout their length including the region where the bottom wall is upwardly bent as to provide an uninterrupted box sectional transverse connection between said longitudinal side sill structures thereby giving the underframe structure as a whole great rigidity and torsional strength.

8. In a chassis or body underframe structure for automobiles, longitudinal side sill structures, a box sectional transverse sill interconnecting said side sill structures; said transverse sill comprising a bottom wall, about vertical side walls, and a top wall; the main portion of said bottom wall being arranged at a level beneath the lower edges of said side sill structures and the transverse sill being of such width as to afford considerable storage space in its interior; said bottom wall being upwardly bent in and closely adjacent the region of the longitudinal vertical middle plane of said underframe structure as to provide a tunnel for a longitudinal driving shaft and having its end likewise upwardly bent as to meet and being fastened to said side sill structures at about the lower edges thereof.

9. In a vehicle structure, longitudinal lower side members and a floor panel extending between said side members, said panel being formed with an upward offset to afford clearance for projecting portions of an axle such as for a differential, said offset extending the full width between said side members, said side members extending downwardly to about at least the plane defined by the lower margins of said offset in the same longitudinal region of the vehicle so that the ends of the offset are closed, said offset presenting a strong hollow transverse member reinforcing the floor panel over its entire width and interbracing the side members on both sides of the vehicle.

10. In a vehicle structure, longitudinal side members and a floor panel extending therebetween, said panel being formed with an upward offset to afford clearance above certain portions of an axle between said side members, said offset extending the full width of the vehicle and above the lower margins of said side members in the same longitudinal region, thereby presenting a strong transverse member between said side sill structures and a transverse reinforcement for the floor panel itself, said panel being furthermore provided with housings at the ends of said offset so as to additionally reinforce the latter, said housings being adapted to receive parts of shock absorbers.

JOSEPH LEDWINKA.
GEORGE TRAUTVETTER.
JOHN W. KELLY.